United States Patent
Seo

(10) Patent No.: US 12,302,870 B2
(45) Date of Patent: May 20, 2025

(54) METHOD OF CONTROLLING AMOUNT OF FODDER FOR SOWS BASED ON ARTIFICIAL INTELLIGENCE AND APPARATUS THEREFOR

(71) Applicant: M3SEN Co., Ltd., Seoul (KR)

(72) Inventor: Man Hyoung Seo, Bucheon-si (KR)

(73) Assignee: M3SEN CO., LTD., Seoul (KR)

( * ) Notice: Subject to any disclaimer, the term of this patent is extended or adjusted under 35 U.S.C. 154(b) by 0 days.

(21) Appl. No.: 18/335,373

(22) Filed: Jun. 15, 2023

(65) Prior Publication Data

US 2023/0404029 A1    Dec. 21, 2023

(30) Foreign Application Priority Data

Jun. 20, 2022   (KR) .................. 10-2022-0074988

(51) Int. Cl.
*A01K 5/02* (2006.01)
*A01K 29/00* (2006.01)

(52) U.S. Cl.
CPC .......... *A01K 5/0283* (2013.01); *A01K 29/005* (2013.01)

(58) Field of Classification Search
CPC ...... A01K 5/0283; A01K 29/005; A01K 5/02; A01K 29/00
See application file for complete search history.

(56) References Cited

U.S. PATENT DOCUMENTS

| | | | |
|---|---|---|---|
| 2020/0125849 A1* | 4/2020 | Labrecque | ............... A01K 5/02 |
| 2021/0176970 A1* | 6/2021 | Engstrom | .......... G05B 13/0265 |
| 2022/0312698 A1* | 10/2022 | Burkey | ............... G06Q 10/063 |
| 2023/0073738 A1* | 3/2023 | Wernimont | ............ G06V 10/46 |

FOREIGN PATENT DOCUMENTS

| | | | | |
|---|---|---|---|---|
| JP | 2019-195295 A | | 11/2019 | |
| KR | 21030110340 | * | 10/2013 | ............... A01K 7/00 |
| KR | 10-1352393 B1 | | 1/2014 | |
| KR | 10-2021-0014980 A | | 2/2021 | |
| KR | 10-2356443 B1 | | 2/2022 | |

OTHER PUBLICATIONS

Jingsong et al, ("Automatic Sheep behavior analysis using mask R-CNN", IEEE 2021) (Year: 2021).*
Office Action issued in Korean Patent Application No. 10-2022-0074988 dated Aug. 12, 2022, 14 pages (with English translation).
Office Action issued in Korean Patent Application No. 10-2022-0074988 dated Dec. 30, 2022, 16 pages (with English translation).

(Continued)

*Primary Examiner* — Amara Abdi
(74) *Attorney, Agent, or Firm* — Crowell & Moring LLP

(57) ABSTRACT

A feed supply amount control method for sows and an apparatus therefor are disclosed. A feed supply control device recognizes morphological data of a sow through a sensor, determines a weight management information including a body condition score of the sow based on the morphological data, and controls the amount of feed to be supplied to the sow according to the weight management information.

10 Claims, 16 Drawing Sheets

(56) References Cited

OTHER PUBLICATIONS

Office Action issued in Korean Patent Application No. 10-2022-0074988 dated May 30, 2023, 7 pages (with English translation).
Pig People, "Breeding pig group body condition score? Should be evenly managed," http://www.pigpeople.net/mobile/article.html?no=6060, Jan. 24, 2019, 9 pages (with English abstract).
Pig Times, "Porks are changing, what should we do about backfat thickness?" http://www.pigtimes.co.kr/news/articleViewAmp.html?idxno=42531, Mar. 12, 2020, 5 pages (with English abstract).

\* cited by examiner

METHOD OF CONTROLLING AMOUNT OF FODDER FOR SOWS BASED ON ARTIFICIAL INTELLIGENCE AND APPARATUS THEREFOR

CROSS-REFERENCE TO RELATED APPLICATION

This application is based on and claims priority under 35 USC § 119 to Korean Patent Application No. 10-2022-0074988, filed on Jun. 20, 2022, in the Korean Intellectual Property Office, the disclosure of which is incorporated by reference herein in its entirety.

BACKGROUND

1. Field

The embodiments relate to a method and apparatus for controlling the amount of feed supplied to a sow based on artificial intelligence.

2. Description of the Related Art

Supplying a gestational or lactating sow in a precisely controlled amount of feed at intervals of a preset period according to a body condition score, body weight, back fat thickness, number of fetuses or suckling piglets, gestational age or postpartum period is one of the most important breeding techniques in the swine industry.

For this reason, an operator visually observes the body condition score or body weight of a sow, or finely controls and supplies the feed according to the gestation age or postpartum period of the sow. However, such a method that relies on the visual observation by the operator is difficult to achieve optimal feeding control even in the case of skilled operators since it is problematic for operators to visually observe a large number of hundreds or more gestational sows in short intervals and control the amount of feed supplied to each individual, which requires a lot of manpower and a lot of working time. In addition, it is difficult for the operator to visually recognize the back fat thickness and the number of fetuses from an image captured by an ultrasound sensor.

SUMMARY

The technical challenge to be achieved by the embodiments is to provide a method and apparatus capable of automatically controlling the amount of feed supplied to sows based on morphological data of each sow recognized through a non-contact sensor.

Additional aspects will be set forth in part in the description which follows and, in part, will be apparent from the description, or may be learned by practice of the presented embodiments of the disclosure.

To achieve the technical challenge, an example of a method of controlling the amount of feed supplied according to an embodiment includes, a method of controlling the amount of feed supplied by a feed supply device, including: recognizing morphological data of a sow through a sensor; determining weight management information including the body condition score of the sow based on the morphological data; and controlling the amount of feed supplied based on the weight management information.

To achieve the technical challenge, an example of a feed supply device according to an embodiment includes, a feed storage container that stores feed supplied through a feed transfer pipe; a feed dispenser that supplies the feed in the feed storage container to a feed tub; a sensor that measures the morphology of the sow; and a controller that controls the feed dispenser to provide feed in an amount determined based on the morphological data of the sow recognized by the sensor.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
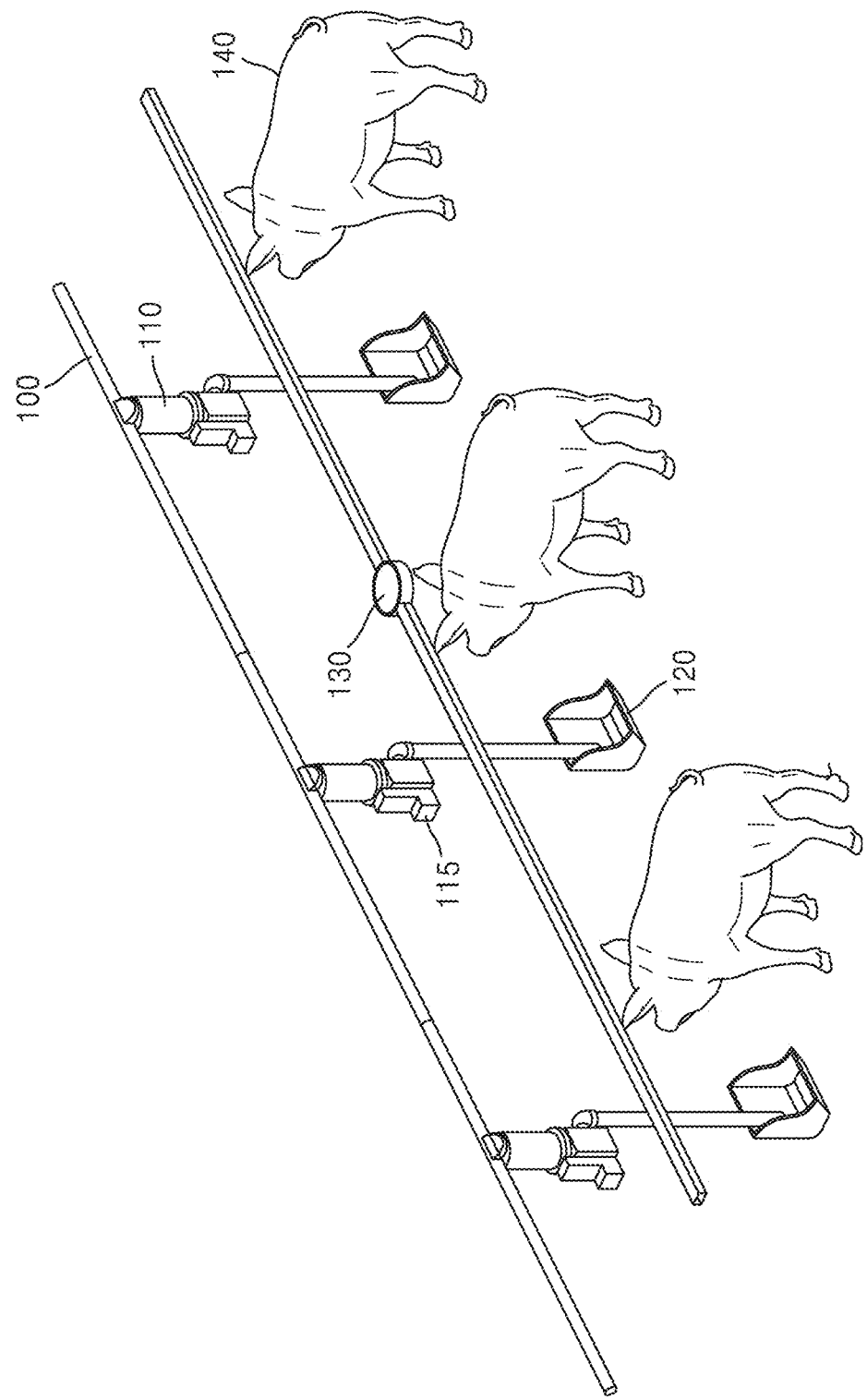
FIG. 1 is a view schematically illustrating a configuration of an example of a feed supply device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a method of controlling the amount of feed supplied and apparatus for sows according to an embodiment will be examined in detail with reference to the attached drawings.

FIG. 1 is a view schematically illustrating a configuration of an example of a feed supply device according to an embodiment.

Referring to FIG. 1, the feed supply device includes a feed storage container 110, a feed dispenser 115, a feed tub 120, a sensor 130, and a controller (not shown). Multiple gestational sows or multiple lactating sows are isolated in each breeding pens (in other words, stall), however the drawing of the present embodiment omits the breeding pen.

The feed storage container 110 stores feed supplied through a feed transfer pipe 100, and the feed dispenser 115 supplies feed from the feed storage container 110 to the feed tub 120. The feed storage container 110, the feed dispenser 115, and the feed tub 120 may exist for each breeding pen. Although not illustrated in this embodiment, a drinking water dispenser for supplying water to the feed tub 120 may be further included.

The sensor 130 measures the morphology of the sow 140 located in the breeding pen to generate morphological data. The sensor 130 is a non-contact sensor, and may be, for example, a sensor that measures a 2D or 3D image. An example of a sensor 130 is shown in FIG. 2.

As an example, the sensor 130 may measure morphological data of multiple sows 140 while moving through multiple breeding pens along a rail installed from a certain height from the floor. In another embodiment, the sensor 130 may exist for each breeding pen.

The controller (not shown) determines the amount of feed supplied based on the morphological data of the sow recognized through the sensor 130 and controls the feed dispenser 115 to provide the determined amount of feed. The controller may be implemented as a computer including a memory, a processor (for example, a microprocessor (MCU)), an input/output device, a communicator, etc., and can be wired or wirelessly connected to the feed dispenser (115) and sensor (130). Although the present embodiment describes the controller as a part of the feed supply device, the controller may be implemented as a separate apparatus from the feed supply device. A method of controlling the amount of feed supplied by the controller will be examined in detail in FIG. 3.

Figure 2:
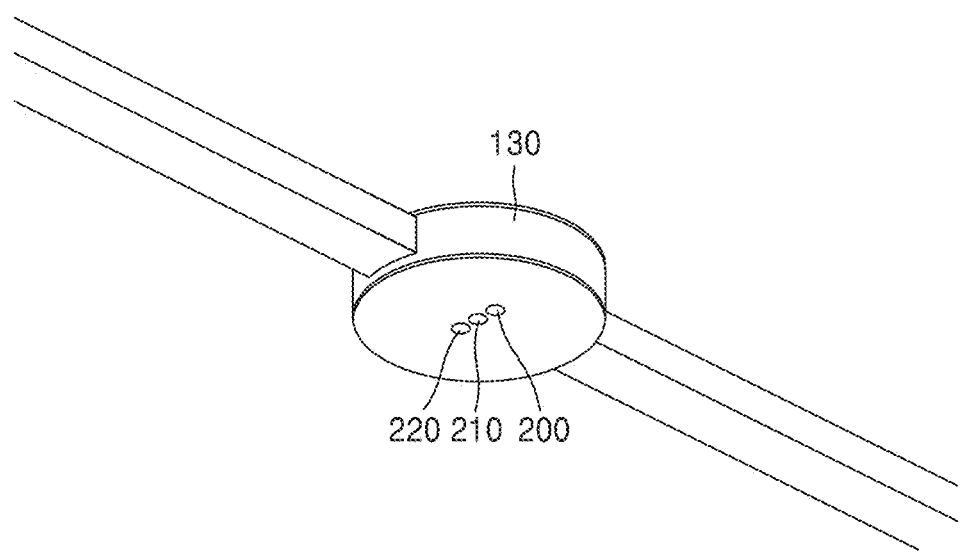
FIG. 2 is a view schematically illustrating an example of a sensor according to an embodiment.

FIG. 2 is a view schematically illustrating an example of a sensor according to an embodiment.

Referring to FIG. 2, the sensor 130 may include an image sensor 210 that captures a 2D or 3D image. As an example of an image sensor for capturing a 3D image, a stereo camera, a ToF camera, various sensors supporting a structured light method or a light triangulation method, etc. may be used. As another embodiment, the sensor 130 may further include an image camera 200 and/or a temperature sensor 220 in addition to the image sensor 210 that captures 2D and/or 3D images. The body temperature of the sow can be measured through the temperature sensor 220.

Figure 3:
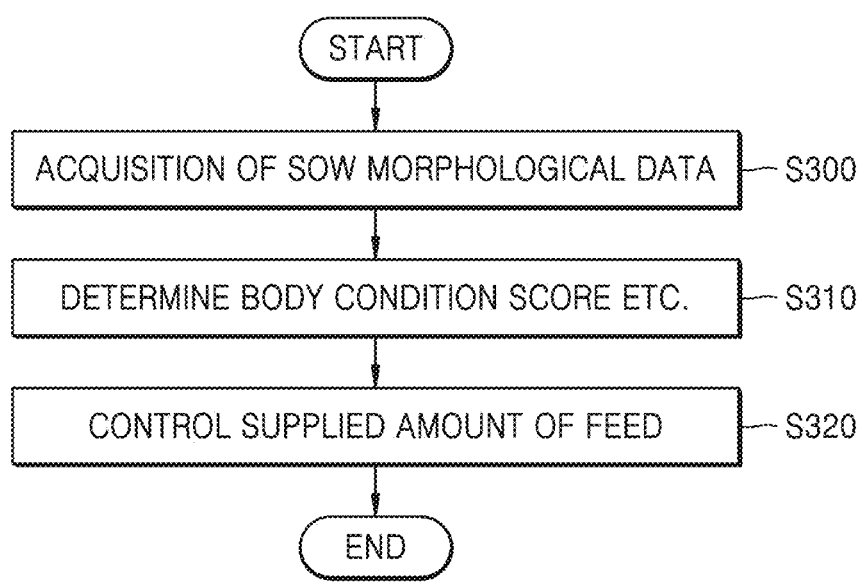
FIG. 3 is a flow diagram illustrating a method of controlling an amount of feed supplied according to an embodiment.

FIG. 3 is a flow diagram illustrating the method of controlling the amount of feed supplied according to an embodiment.

Referring to FIG. 3, the controller obtains morphological data of the sow using a sensor S300. The morphological data may be an image of a sow captured in 2D or 3D, or information on the volume, size, and dimensions (height, length, width, isometric angle, etc.) of the sow. It is desirable to measure the morphological data of the sow in a standing state to consume feed by supplying feed through the controller.

The controller determines weight management information including the body condition score of the sow based on the morphological data S310. In the past, a manager would directly observe the sow with the naked eye or palpated the acetabular process of the sow to classify whether the sow was skinny or fat and gave a body condition score. However, when there are a large number of sows, there is a challenge in that it is difficult for the manager to individually observe or palpate the body condition score of sows. Therefore, this embodiment determines a body condition score based on morphological data obtained through a non-contact sensor.

Figure 4:
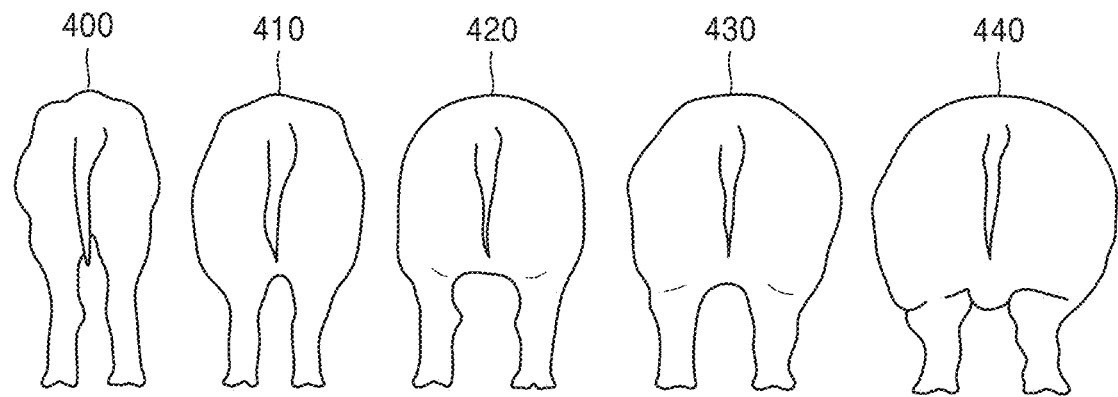
FIG. 4 is a view schematically illustrating various body shapes for calculating a body condition score according to an embodiment.

According to an embodiment, as shown in FIG. 4, the controller may calculate the body condition score by determining which of the standard morphological images the sow is most similar to, after defining a standard morphological image for assigning a body condition score, comparing the morphological data recognized through the sensor. A variety of related image comparison algorithms may be used.

Figure 5:
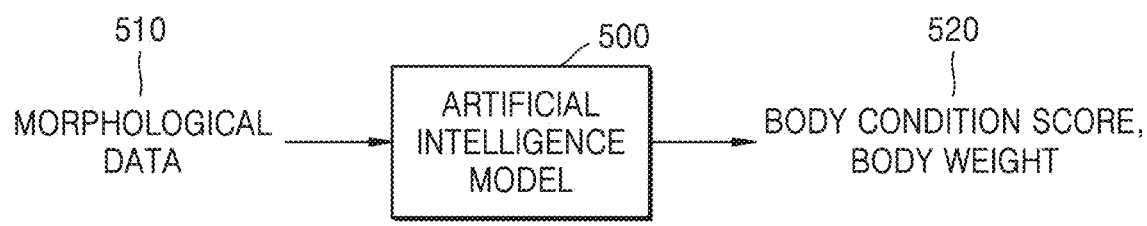
FIG. 5 is a view schematically illustrating an example of a method of calculating a body condition score using an artificial intelligence model according to an embodiment.

As another embodiment, the controller may calculate the body condition score using an artificial intelligence model trained by labeling various morphological images to body condition scores as shown in FIG. 4. An example of a method of determining a body condition score using an artificial intelligence model is shown in FIG. 5.

Figure 8:
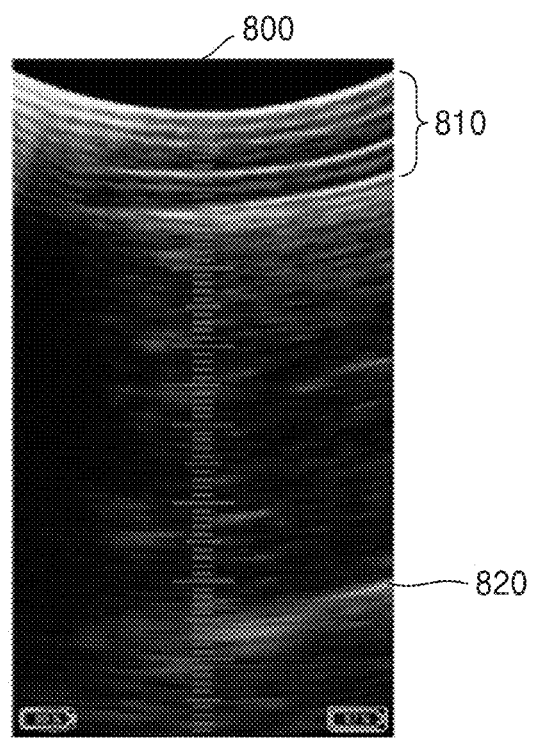
FIG. 8 is a view schematically illustrating an example of an ultrasound image for measuring the back fat thickness of a sow according to an embodiment.

As another embodiment, the controller may determine the body condition score by considering both the body shape (in other words, morphological data) and back fat thickness of the a sow. A mapping relationship of body condition scores according to body shape and back fat thickness may be predefined. For example, with respect to the fourth morphological image 430 of FIG. 4, if the back fat thickness is 21 mm to 25 mm, the body condition score is 4, and if it is less than 21 mm, the body condition score is 3.5. It is assumed that the criteria for the body condition score considering both body shape and back fat thickness are defined in advance. Back fat thickness can be recognized through an ultrasound image as shown in FIG. 8. As another example, since it is difficult to recognize the back fat thickness of sows using an ultrasound sensor every day, the back fat thickness using an ultrasound sensor is intermittently recognized, the back fat thickness at the present time may be estimated by considering the back fat thickness previously identified using the ultrasound sensor and the current body shape (for example, morphological data).

The controller may determine the body weight based on the morphological data. For example, body weight can be determined from morphological data using a predefined artificial intelligence model, which will be reviewed again in FIG. 5.

Figure 6:
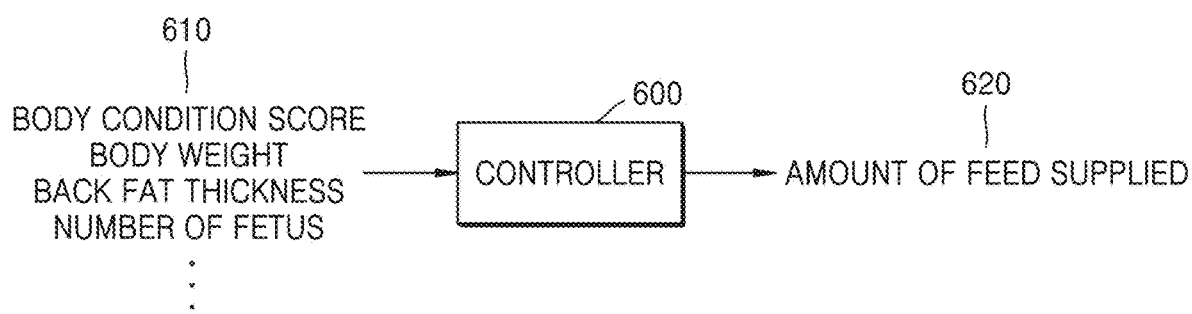
FIG. 6 is a view schematically illustrating an example of a method of determining the amount of feed supplied according to an embodiment.

The controller controls the amount of feed supplied according to the weight management information including the body condition score S320. Optimal body condition score (hereinafter referred to as standard body condition score) are different for a gestational sow and a lactating sow, and the standard body condition score may differ depending on the gestation age or lactation period. In addition, the standard body condition score may vary depending on the number of fetuses of the gestational sow. Therefore, the controller controls the amount of feed supplied to the sow by comparing the optimal standard body condition score for the gestation age of the sow, the number of fetuses or the lactation period of the sow with the body condition score determined based on the morphological data of the sensor. For example, if the standard body condition score of the sow is 2.5 points and the body condition score of the sow determined at the present time is 2 points, the amount of feed supplied is increased so that the body condition score of the sow is 2.5. Conversely, if the standard body condition score of the sow is 2.5 points and the body condition score of the sow determined at the present time is 3 points, the amount of feed supplied to the sow is reduced in order to lower the body condition score. An example of how the controller controls the amount of feed supplied is shown in FIG. 6.

FIG. 4 is a view schematically illustrating examples of various body shapes for calculating the body condition score according to an embodiment.

Referring to FIG. 4, the body shape of the sow is different depending on the degree of fatness or thinness of the sow. Depending on the body type, a body condition score of 1 to 5 can be given. The controller may predefine the morphological images 400, 410, 420, 430, 440 corresponding to the body condition score, and then automatically calculate the body condition score by comparing them with the morphological data recognized by the sensor. Although this embodiment shows a morphological image of the back of a sow for better understanding, the morphological image may be a 2D or 3D image or various types of images taken from various angles. As another embodiment, the controller may train an artificial intelligence model using various morphological images as learning data to calculate a body condition score, an example of which is shown in FIG. 5.

FIG. 5 is a view schematically illustrating an example of a method of calculating a body condition score using an artificial intelligence model according to an embodiment.

Referring to FIG. 5, the artificial intelligence model 500 outputs a body condition score and/or body weight 520 upon receiving morphological data 510 acquired through a sensor. Artificial intelligence models of other embodiments below, including this embodiment, may be implemented with various existing artificial neural networks such as convolutional neural network (CNN).

The artificial intelligence model 500 can be generated by training with learning data in which various morphological images as shown in FIG. 4 are labeled with body condition score. For example, the artificial intelligence model 500 can be trained by a supervised learning method using learning data in which body condition scores of 1 to 5 are prelabeled according to the degree of fatness in various morphological images as shown in FIG. 4. Since the labeling of learning data and the supervised learning method are already widely known, an additional description thereof will be omitted.

As another embodiment, the artificial intelligence model 500 may be a model that outputs a body condition score and/or a body weight in consideration of morphological data and back fat thickness. In this case, the learning data may be data obtained by labeling input data of various morphological images and back fat thickness as a body condition score. The trained artificial intelligence model 500 outputs a body condition score and/or body weight upon receiving morphological data and back fat thickness. Here, the back fat thickness may be a value measured using an ultrasound sensor or a value estimated based on previously measured back fat thickness and current morphological data (in other words, body shape). That is, since the back fat thickness increases as the body shape increases, the back fat thickness at the present time can be estimated based on the back fat thickness intermittently measured without measuring the back fat thickness through the ultrasound sensor every time.

FIG. 6 is a view schematically illustrating an example of a method of determining the amount of feed supplied according to an embodiment.

Referring to FIG. 6, the controller 600 determines the amount of feed supplied 620 based on input of weight management information 610 including body condition score, body weight, back fat thickness, etc.

Depending on the gestation age of a gestational sow or the lactation period of a lactating sow, there is a body condition score suitable for the sow. For example, a standard body condition score suitable for a sow at each time point of early pregnancy, mid pregnancy, and late pregnancy may be different. In addition, in the case of gestational sows, suitable standard body condition scores may differ depending on the number of fetuses. The controller predefines and stores information on basic body condition scores according to the gestation age and number of fetuses of the gestational sow, and the lactation period of the lactating sow.

Accordingly, the controller 600 initially receives information such as the gestation age (for example, conception date, etc.) and the number of fetuses when the sow enters the breeding pen of FIG. 1. In addition, the controller 600 determines the body condition score or body weight of a sow based on the morphological data recognized through the sensor. The controller 600 determines the standard body condition score according to the gestation age and the number of fetuses of the sow, and compares the body condition score determined through the sensor at the present time with the standard body condition score to determine an increase or decrease in the amount of feed. The controller may limit the range of the amount of feed to be increased or decreased to a preset range (for example, increase or decrease in increments of 500 g, etc.) in order to prevent rapid body weight change of sows. For example, if an increase in body condition score is required, the controller may provide an increased amount of feed, and conversely, if a decrease in body condition score is required, the controller may provide a reduced amount of feed.

Figure 7:
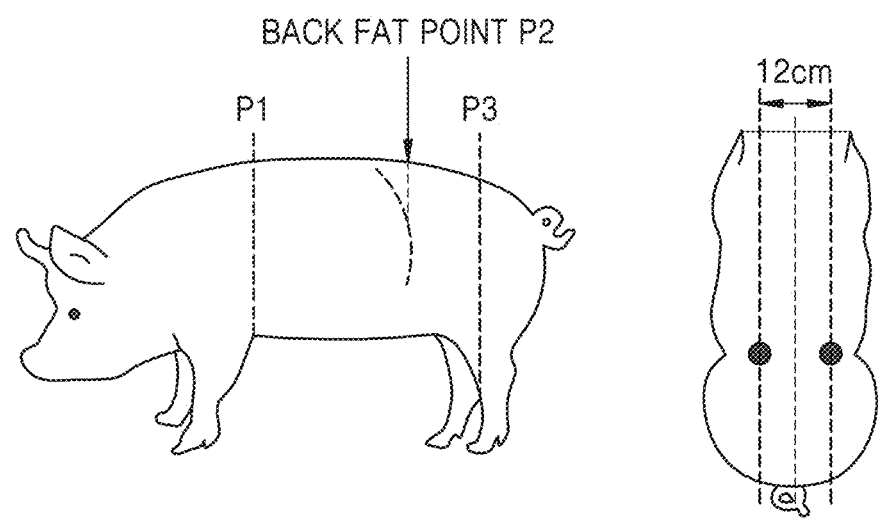
FIG. 7 is a view schematically illustrating an example of a region for measuring a back fat thickness of a sow according to an embodiment.

FIG. 7 is a view schematically illustrating an example of a part for measuring back fat thickness of a sow according to an embodiment, and FIG. 8 is a view schematically illustrating an example of an ultrasound image for measuring the back fat thickness of a sow according to an embodiment.

Referring to FIG. 7 and FIG. 8, the back fat thickness of the sow can be measured at the point P2. If the measuring point of the back fat thickness is different each time, the reliability of the measured back fat thickness is lowered, so it is necessary to measure the back fat thickness at a predefined location (that is, P2 point).

back fat thickness cannot be checked with the naked eye, so an ultrasound sensor is used. An ultrasound image may be acquired by contacting the ultrasound sensor to a predefined position (that is, point P2) of the sow. In the ultrasound image 800, as shown in FIG. 8, a fat layer line 810 and ribs 820 appear. However, it may be difficult for a general manager to accurately recognize the back fat thickness from the ultrasound image. This embodiment presents a method of recognizing back fat thickness from an ultrasound image using an artificial intelligence model, which will be reviewed again in FIG. 10.

Figure 9:
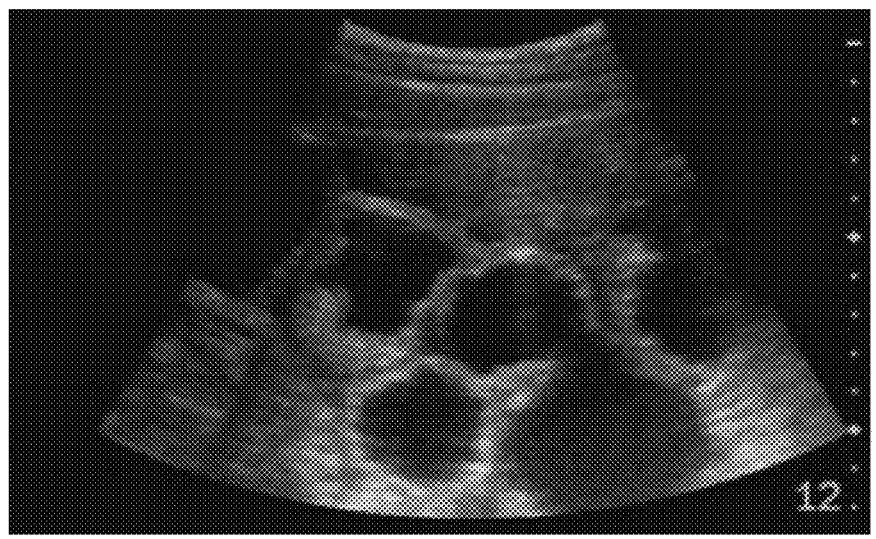
FIG. 9 is a view schematically illustrating an example of an ultrasound image for determining a number of fetuses of a sow according to an embodiment.

FIG. 9 is a view schematically illustrating an example of an ultrasound image for determining the number of fetuses of a sow according to an embodiment.

Referring to FIG. 9, it is possible to determine the number of fetuses of a sow by an ultrasound image. The number of black circles that look like clusters of grapes on the ultrasound image is the number of fetuses. However, since it may be difficult for a general manager to determine the exact number of fetuses from an ultrasound image, it is possible to determine the number of fetuses from an ultrasound image using an artificial intelligence model, which will be reviewed again in FIG. 11.

Figure 10:
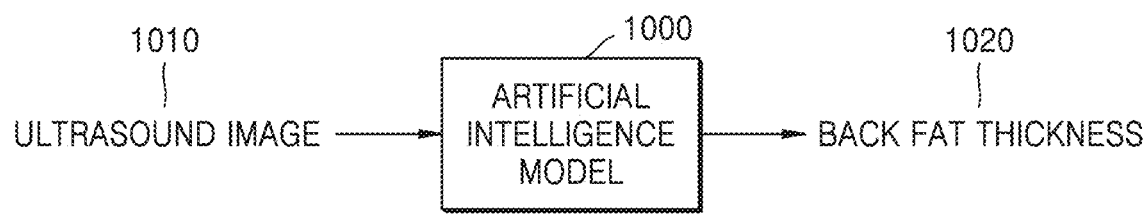
FIG. 10 is a view schematically illustrating an example of a method of determining the back fat thickness using the artificial intelligence model according to an embodiment.

FIG. 10 is a view schematically illustrating an example of a method of recognizing back fat thickness using an artificial intelligence model according to an embodiment.

Referring to FIG. 10, an artificial intelligence model 1000 is generated by training with learning data including an ultrasound image labeled with back fat thickness. When an ultrasound image 1010 is input to the learned artificial intelligence model, the artificial intelligence model 1000 predicts and outputs the back fat thickness 1020.

Figure 11:
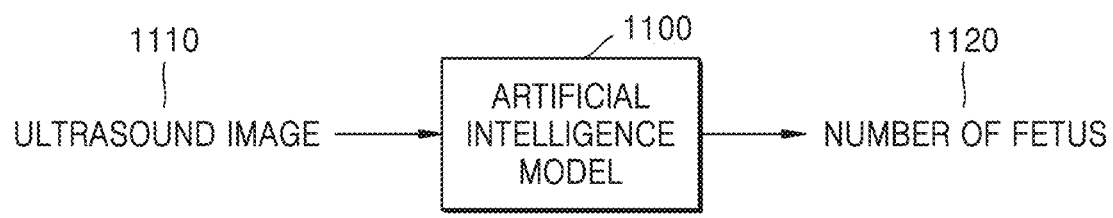
FIG. 11 is a view schematically illustrating an example of a method of determining the number of fetuses using the artificial intelligence model according to an embodiment.

FIG. 11 is a view schematically illustrating an example of a method of determining the number of fetuses using an artificial intelligence model according to an embodiment.

Referring to FIG. 11, an artificial intelligence model 1100 is generated by training using learning data in which ultrasound images are labeled with the number of fetuses. When the ultrasound image 1110 is input to the trained artificial intelligence model 1100, the artificial intelligence model 1100 predicts and outputs the number of fetuses 1120.

Figure 12:
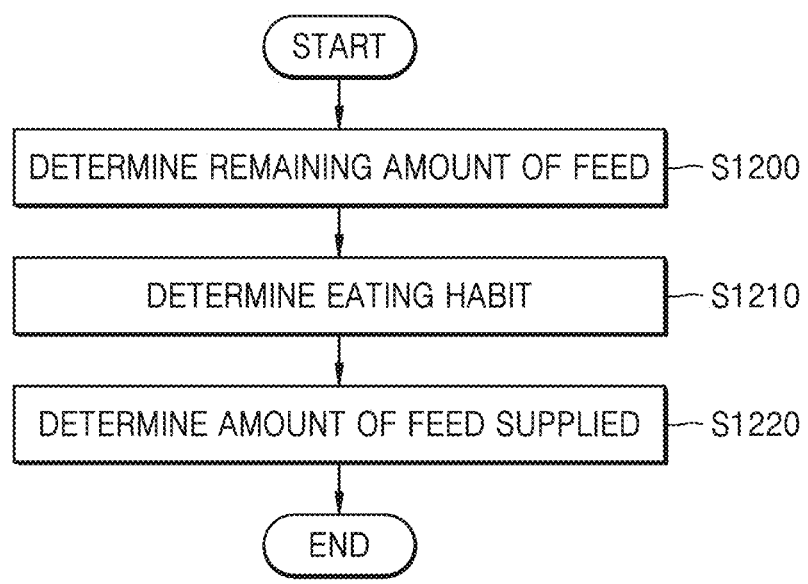
FIG. 12 is a flow diagram illustrating another embodiment of the method of controlling the amount of feed supplied according to an embodiment.

FIG. 12 is a flow diagram illustrating another embodiment of a method of controlling an amount of feed supplied according to an embodiment.

Referring to FIG. 12, the controller recognizes the remaining amount of feed in the feed tub S1200. For example, the controller may recognize the remaining amount of feed from an image of the feed tub through a sensor. The remaining amount of feed in the feed tub can be recognized through an artificial intelligence model, and an example thereof is shown in FIG. 13.

The controller determines the eating habits of the sow based on the remaining amount of feed S1210. For example, feed is supplied several times during the day, and the maximum intake amount, intake frequency, or pattern may differ from each other depending on the sow. If a large amount of feed is supplied at once and the sow does not eat all of it and leaves it, the palatability of the sow for the remaining feed may decrease and may not be eaten well. In addition, during the summer, it may quickly spoil and harm the health of sows. Conversely, when feed is insufficient, sows are hungry and often stand up, which increases the probability of crushing piglets in the case of lactating sows. Therefore, the controller determines the amount of feed to be supplied according to the eating habits after determining the eating habits such as the maximum intake amount of the sow by recognizing the remaining amount of feed (S1220).

Figure 13:
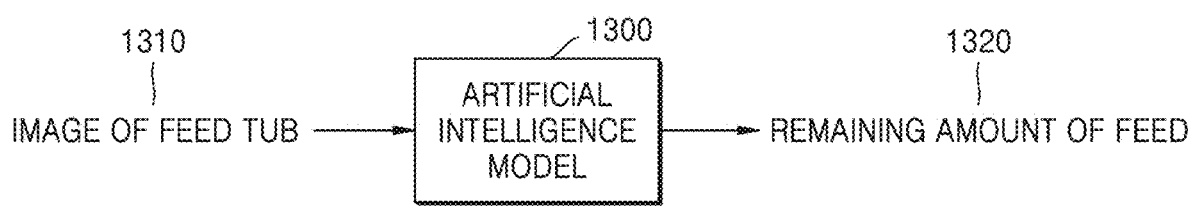
FIG. 13 is a view schematically illustrating an example of a method of determining a remaining amount of feed using the artificial intelligence model according to an embodiment.

FIG. 13 is a view schematically illustrating an example of a method of recognizing the remaining amount of feed using an artificial intelligence model according to an embodiment.

Referring to FIG. 13, an artificial intelligence model 1300 is generated by training a captured image of a feed tub with learning data labeled as the remaining amount of feed. For example, the learning data may include images of feed tubs with various remaining amount of feed. When the trained artificial intelligence model 1300 receives the image 1310 of the feed tub, it predicts and outputs the remaining amount of feed 1320.

Figure 14:
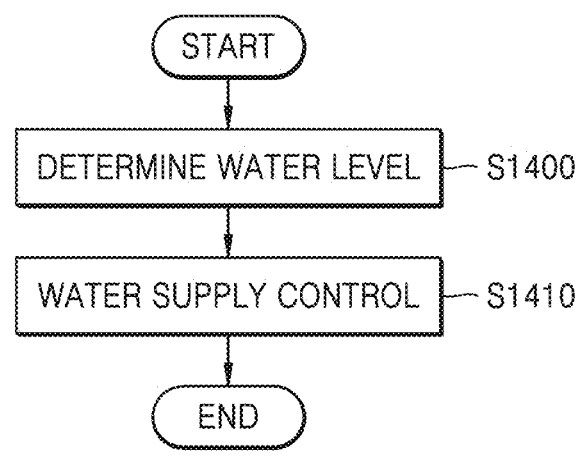
FIG. 14 is a flow diagram illustrating an example of a method of controlling water supply according to an embodiment.

FIG. 14 is a flow diagram illustrating an example of a method of controlling water supply according to an embodiment.

Referring to FIG. 14, the controller recognizes the level of water supplied to the feed tub S1400. For example, the controller may recognize the water level from an image of the feed tub through a sensor. The water level of the feed tub can be recognized through an artificial intelligence model, and an example thereof is shown in FIG. 14.

Sows not only consume water from the feed tub, but also use the water from the feed tub to cool down body temperature in the summer. However, if feed is supplied while water remains in the feed tub, the feed may be submerged in water, making it difficult to ingest, and is also prone to decay. Therefore, the controller recognizes the water level of the feed tub and removes the water from the feed tub S1410 if there is water before supplying feed.

Figure 15:
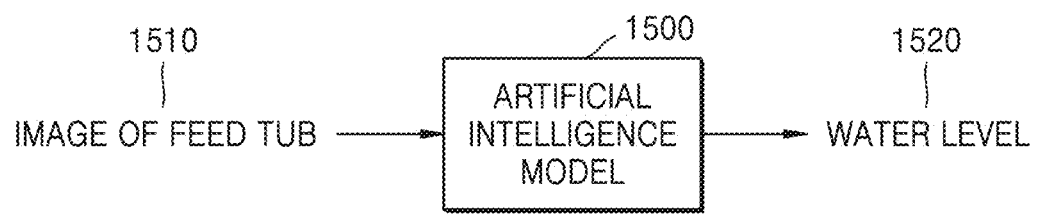
FIG. 15 is a view schematically illustrating an example of a method of determining a water level using an artificial intelligence model according to an embodiment.

FIG. 15 is a view schematically illustrating an example of a method of recognizing water level using an artificial intelligence model according to an embodiment.

Referring to FIG. 15, an artificial intelligence model 1500 is generated by training with learning data including an image of a feed tub 1510 labeled with a water level. When the trained artificial intelligence model 1300 receives the image of the feed tub 1310, the artificial intelligence model 1500 predicts and outputs the water level.

Figure 16:
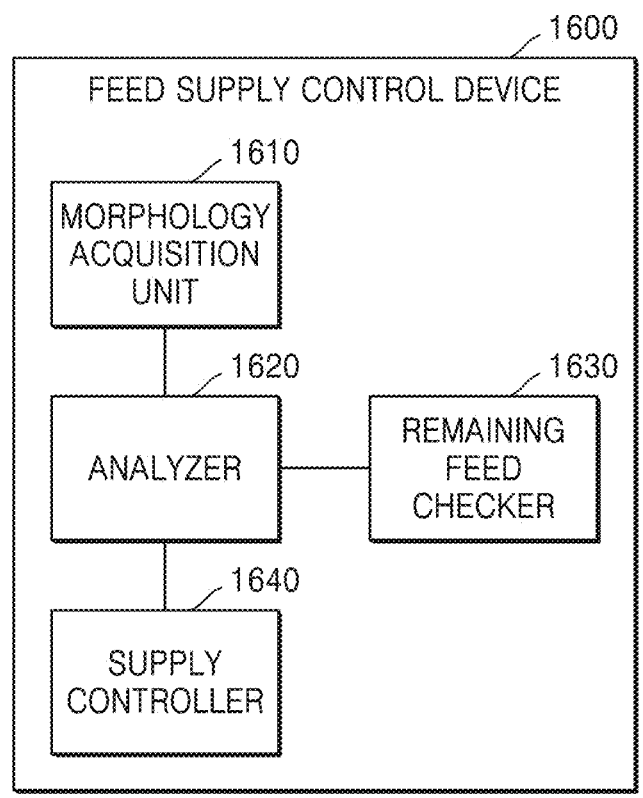
FIG. 16 is a view schematically illustrating a configuration of an example of a feed supply control device according to an embodiment.

FIG. 16 is a view schematically illustrating the configuration of an example of a feed supply control device according to an embodiment.

Referring to FIG. 16, the feed supply control device 1600 has a configuration corresponding to the controller of FIG. 1, including an morphology acquisition unit 1610, an analyzer 1620, a remaining feed checker 1630, and a supply controller 1640. Depending on the embodiment, the remaining feed checker 1630 may be omitted. However, in the following description, it is assumed that a remaining feed checker is included for convenience of explanation. The feed supply control device 1600 may be implemented as a computing device including a memory, a processor, and an input/output device. In this case, each component may be implemented as a software, loaded into a memory, and then executed by a processor.

The morphology acquisition unit 1610 recognize the morphological data of the sow through the sensor. For example, the morphology acquisition unit 1610 may acquire morphological data including a 2D or 3D image of the sow by using a sensor that captures a 2D or 3D image.

As another embodiment, the morphology acquisition unit 1610 may receive an ultrasound image captured by an ultrasound sensor. For example, when the ultrasound image of FIG. 8 or FIG. 9 is received, the morphology acquisition unit may determine and store the back fat thickness or the number of fetuses from the corresponding ultrasound image.

The analyzer 1620 determines a weight management information including the body condition score of a sow based on the morphological data. The analyzer 1620 may determine information such as body weight, back fat thickness, etc. along with the body condition score. For example, the analyzer 1620 may determine body condition score and/or body weight from morphological data using an artificial intelligence model. As another embodiment, the analyzer 1620 may estimate the back fat thickness at the present time without taking an ultrasound image, in consideration of the back fat thickness found from past ultrasound images and the body weight at the current time.

The supply controller 1640 controls the amount of feed to be supplied to the sows according to the weight management information including the body condition score. An optimal body condition score (in other words, standard body condition score) suitable for the gestation age of a gestational sow or the lactation period of a lactating sow may be predefined. The supply controller 1640 may determine an increase or decrease in the amount of feed supplied by comparing the body condition score determined based on the morphological data with the standard body condition score.

The remaining feed checker 1630 determines the eating habits of sows based on the remaining amount of feed remaining in the feed tub. The remaining feed checker 1630 may determine eating habits such as the maximum intake amount of the sow by recognizing the remaining amount of feed of the feed tub. The supply controller 1640 may supply feed only up to the maximum amount that the sow can consume at one time, according to the eating habit determined by the remaining feed checker 1630, rather than providing the amount of feed supplied based on the body condition score all at once. In addition to this, the supply controller 1640 can recognize the water level of the feed tub as shown in FIG. 14 and remove water from the feed tub before supplying the feed.

according to an embodiment, the amount of feed to be supplied to the sow can be automatically controlled based on the morphological data of the sow recognized through the non-contact sensor. For example, it is possible to finely control the amount of feed provided to gestational sows or lactating sows by determining the body condition score or body weight of the sow from the morphological data of the sow. As another embodiment, recognizing the back fat thickness and/or the number of fetuses of a sow from an ultrasound image captured by an ultrasound sensor can be automated using an artificial intelligence model.

The disclosure can also be implemented as program code that can be read by a computer on a computer-readable recording medium. A computer-readable recording medium includes all types of recording devices in which data that can be read by a computer system is stored. Examples of computer-readable recording medium include ROM, RAM, CD-ROM, magnetic tape, floppy disk, optical data storage devices, etc. In addition, the computer-readable recording medium may be distributed to computer systems connected through a network to store and execute computer-readable codes in a distributed manner.

So far, the disclosure has been looked at mainly with its desired embodiments. Those skilled in the art to which the disclosure pertains will be able to understand that the disclosure can be implemented in a modified form without departing from the essential characteristics of the disclosure. Therefore, the disclosed embodiments should be considered from a descriptive point of view rather than a limiting point of view. The scope of the disclosure is shown in the claims rather than the foregoing description, and all differences within the equivalent scope will be construed as being included in the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of controlling an amount of feed supplied by a feed supply device, the method comprising:
   recognizing morphological data of a sow through a sensor;
   determining a weight management information including a body condition score of the sow based on the morphological data; and
   controlling the amount of feed supplied according to the weight management information,
   wherein controlling the amount of feed comprises determining the amount of feed supplied by comparing the body condition score with a predefined standard body condition score according to a gestational age and a number of fetuses of the sow.

2. The method of claim 1, wherein the recognizing of the morphological data
   comprise recognizing a 2D or 3D morphological image of the sow through a 2D or 3D sensor.

3. The method of claim 1, wherein the determining of the weight management information
   comprises determining a body condition score of the sow by using an artificial intelligence model trained using learning data in which the morphological data is labeled as the body condition score.

4. The method of claim 3, wherein
   the weight management information includes a body weight along with the body condition score, and
   the determining of the weight management information,
   further comprises determining the body weight of the sow by using an artificial intelligence model trained using learning data in which the morphological data is labeled as the body weight.

5. The method of claim 1,
   further comprising determining the number of fetuses of the sow from the ultrasound image obtained by photographing the sow with an ultrasound sensor using an artificial intelligence model trained with learning data in which the ultrasound image is labeled as the number of fetuses.

6. The method of claim 1, wherein the determining of the weight management information
   comprises determining a body condition score based on the morphological data obtained through the sensor and a back fat thickness recognized through a ultrasound sensor.

7. The method of claim 6,
   further comprising recognizing the back fat thickness of the sow by an ultrasound image obtained by photographing the sow with an ultrasound sensor using an artificial intelligence model trained with learning data in which the ultrasound image is labeled as back fat thickness.

8. The method of claim 6, wherein the determining of the weight management information
   further comprises estimating the back fat thickness at the present time based on the back fat thickness recognized from past ultrasound images and the current morphological data.

9. The method of claim 1, wherein the controlling of the amount of feed comprises
   recognizing a remaining amount of feed in a feed tub; and recognizing the amount of feed supplied according to the feed intake eating habits of the sow identified based on the remaining amount of feed.

10. The method of claim 1, wherein the controlling of the amount of feed comprises recognizing a water level in the feed tub; and supplying feed after removing water from the feed tub.

\* \* \* \* \*